United States Patent [19]
Budnick

[11] Patent Number: 5,868,988
[45] Date of Patent: Feb. 9, 1999

[54] METHOD OF MAKING AN AIR BAG COVER

[75] Inventor: Roger R. Budnick, Clinton Township, Mich.

[73] Assignee: Larry J. Winget, Leonard, Mich.

[21] Appl. No.: 974,466

[22] Filed: Nov. 20, 1997

Related U.S. Application Data

[62] Division of Ser. No. 639,701, Apr. 29, 1996, Pat. No. 5,776,522.

[51] Int. Cl.$^6$ .................................................... B29C 45/17
[52] U.S. Cl. .................... 264/296; 264/328.11; 425/577; 425/468; 425/DIG. 37
[58] Field of Search ..................................... 425/468, 556, 425/577, DIG. 37, DIG. 56, DIG. 119; 264/163, 293, 296, 328.7, 328.11, 334

[56] References Cited

U.S. PATENT DOCUMENTS

| | | | |
|---|---|---|---|
| 4,184,835 | 1/1980 | Talbot | 425/577 |
| 4,820,149 | 4/1989 | Hatakeyama et al. | 425/556 |
| 5,149,479 | 9/1992 | Nakajima | 264/163 |
| 5,183,615 | 2/1993 | Zushi | 425/577 |
| 5,320,380 | 6/1994 | Hamada et al. | 280/728 B |
| 5,334,340 | 8/1994 | Zushi | 264/161 |
| 5,335,935 | 8/1994 | Proos et al. | 280/728 B |
| 5,342,086 | 8/1994 | Harris et al. | 280/731 |
| 5,484,273 | 1/1996 | Parker et al. | 425/112 |
| 5,618,485 | 4/1997 | Gajewski | 264/255 |
| 5,632,914 | 5/1997 | Hagenow et al. | 280/728.1 |
| 5,650,115 | 7/1997 | Proos et al. | 264/156 |

*Primary Examiner*—Jill L. Heitbrink
*Attorney, Agent, or Firm*—Brooks & Kushman P.C.

[57] ABSTRACT

A method and apparatus for making a thermoplastic air bag cover having a hidden tear seam. A molten thermoplastic is injected into a mold cavity of a mold having a shape defining the air bag cover. An insert having a shape defining the tear seam is extended into the mold cavity before the molten plastic completely solidifies. The resulting air bag cover is cooled to a temperature beneath the softening point of the plastic. The completed air bag cover is then removed from the mold. The thickness of the air bag cover at the tear seam is within a range of 0.2 to 0.4 millimeters.

4 Claims, 4 Drawing Sheets

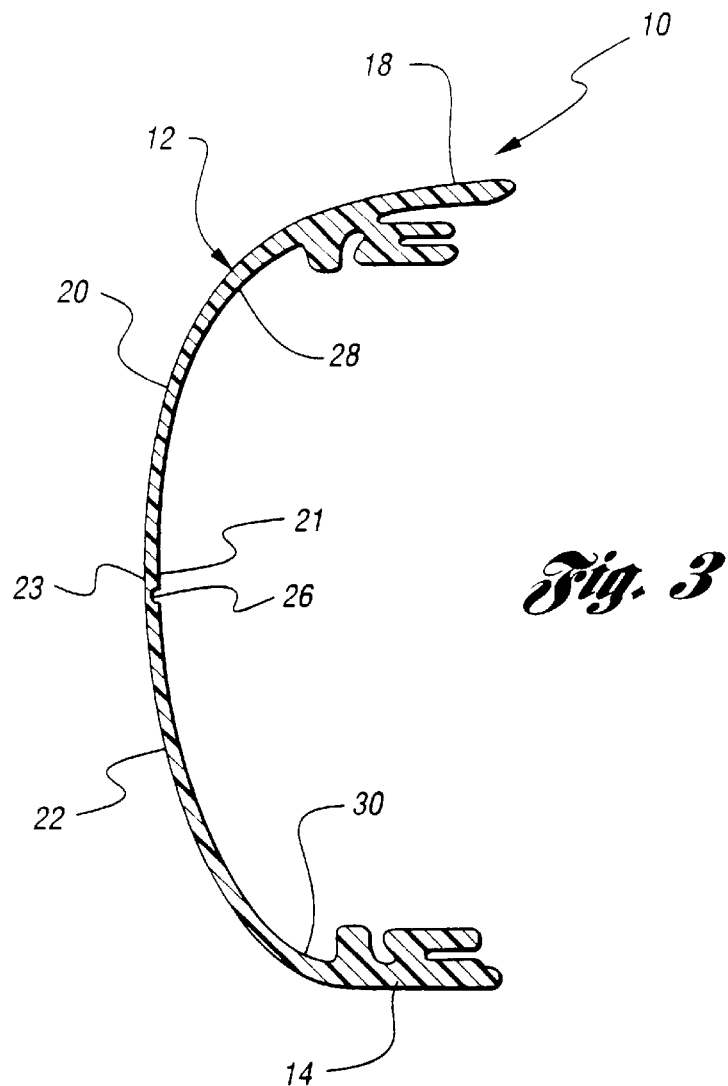
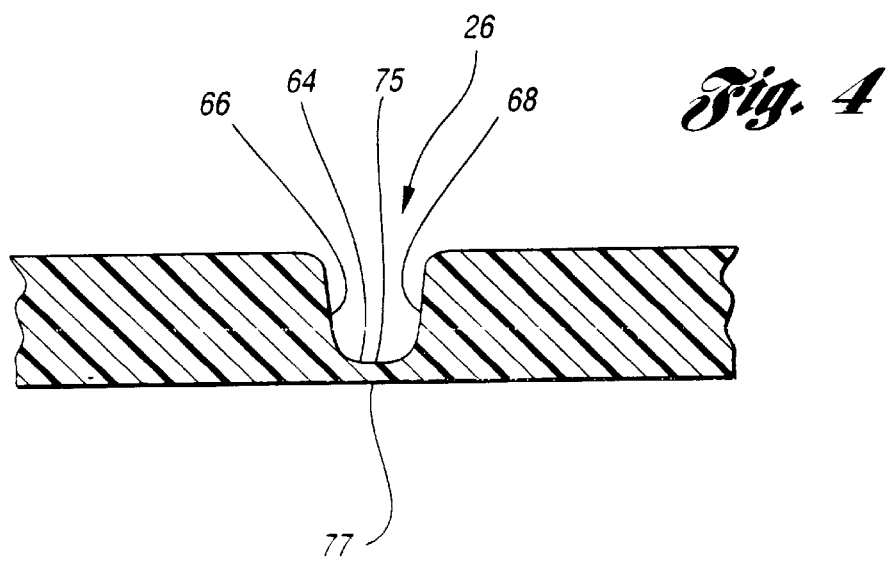

5,868,988

METHOD OF MAKING AN AIR BAG COVER

This is a continuation of application Ser. No. 08/639,701, filed on Apr. 29, 1996 now U.S. Pat. No. 5,776,522.

TECHNICAL FIELD

This invention relates to a plastic air bag cover and a method and apparatus of making same and, in particular, to a plastic air bag cover having a hidden tear seam and a method and apparatus of making same.

BACKGROUND ART

Presently, when air bag covers are provided in automobiles on the driver side of the vehicle, the air bag is stored in the steering column behind an air bag cover. During automatic inflation of the air bag, the air bag cover moves away from the steering column to permit its safety function between the steering column and the operator of the vehicle. Air bag covers may also be provided on the passenger side of the vehicle as well.

Recent practice in the automotive industry is utilization of all plastic fabricated air bag covers. Conventional air bag covers used in conjunction with occupant restraint systems often include noticeable or visually perceptible tear seams or scores disposed on the exterior surface of the air bag cover. The tear seams or scores represent selected weakened surfaces where the inflating air bag initially separates or breaks through the air bag cover and moves away from the steering wheel to perform its safety feature.

Typically, a tear seam is formed into an air bag cover by injecting plastic into an injection mold in which the mold cavity includes a projection defining the tear seam. An example is illustrated in U.S. Pat. No. 5,335,935 issued to Proos et al. However, with this method it is difficult to inject the plastic over the projection, resulting in swirl lines caused by turbulence. Also, it is very difficult to have molten plastic flow over the projection, therefore, the thickness of the tear seam is limited, typically 0.4 millimeters or more.

U.S. Pat. No. 5,320,380, issued to Hamada et al., discloses an air bag cover having a hidden tear seam of less than 0.4 millimeters. However, this air bag cover is manufactured utilizing RIM (Reaction Injection Molding) technology. With RIM, a mold cavity supporting a mesh screen is injected with two liquid materials that chemically react to form a thermoset product. However, a product manufactured utilizing RIM molding is relatively more expensive, less durable and heavier than a product manufactured utilizing thermoplastic injection molding.

DISCLOSURE OF THE INVENTION

It is thus a general object of the present invention to provide a method and system for making a thermoplastic air bag cover having a visually imperceptible tear seam.

It is yet another object of the present invention to provide a method and system for making the thermoplastic air bag cover having the hidden tear seam with reduced knit lines and swirl lines due to turbulence.

In carrying out the above objects and other objects, features and advantages, of the present invention, a method is provided for making an air bag cover having a visually imperceptible tear seam for an inflatable air bag system. The method includes the step of injecting molten thermoplastic into a mold cavity of a mold having a shape defining the air bag cover. The method also includes the step of moving an insert from a retracted position to an extended position within the mold cavity after the step of injecting but before the molten thermoplastic completely solidifies. The method further includes the steps of permitting the resulting air bag cover to cool to a temperature beneath the softening point of the thermoplastic with the insert in its extended position and removing the completed air bag cover from the mold.

In further carrying out the above objects and other objects, features and advantages, of the present invention, an apparatus is also provided for carrying out the steps of the above described method. The apparatus includes a thermoplastic injection mold having first and second mold halves with surfaces which define a mold cavity. The system also includes an insert slidably mounted within a hole within one of the first and second mold halves for movement relative thereto. The insert has a retracted position and an extended position and is extended to the extended position to displace plastic at a predetermined location defining the tear seam.

Still further, in carrying out the above objects and other objects, features and advantages, of the present invention, an air bag cover having a hidden tear seam is provided. The air bag cover includes a thermoplastic elastomeric body molded in an injection mold wherein the thickness of the tear seam is within 0.2–0.4 millimeters.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 is a sectional view of the air bag cover of FIG. 2 taken along lines 3—3 in FIG. 2;

FIG. 4 is an enlarged view of a tear seam constructed in accordance with the present invention;

BEST MODES FOR CARRYING OUT THE INVENTION

Figure 1:
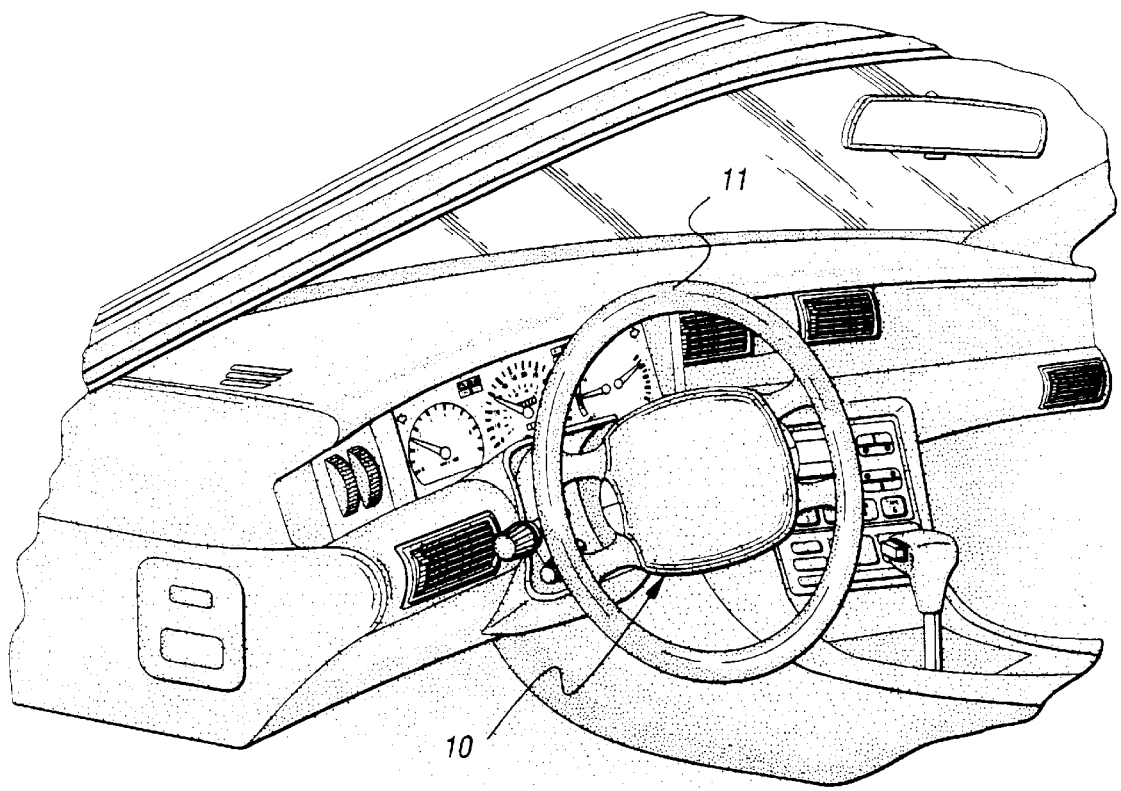
FIG. 1 is an environmental view showing an air bag cover constructed in accordance with the method of the present invention.

Referring now to FIG. 1, there is illustrated an environmental view showing an air bag cover, generally indicated at 10, constructed in accordance with the present invention. The air bag cover 10 preferably is installed over an inflatable air bag system, mounted at the end of a steering wheel post (not shown). The occupant restraint air bag system is typically mounted at the interior end of the steering wheel post within the steering wheel 11 so that the air bag may deploy between the vehicle driver and, the steering wheel post to prevent injury during an accident or other period of sudden deceleration.

Figure 2:
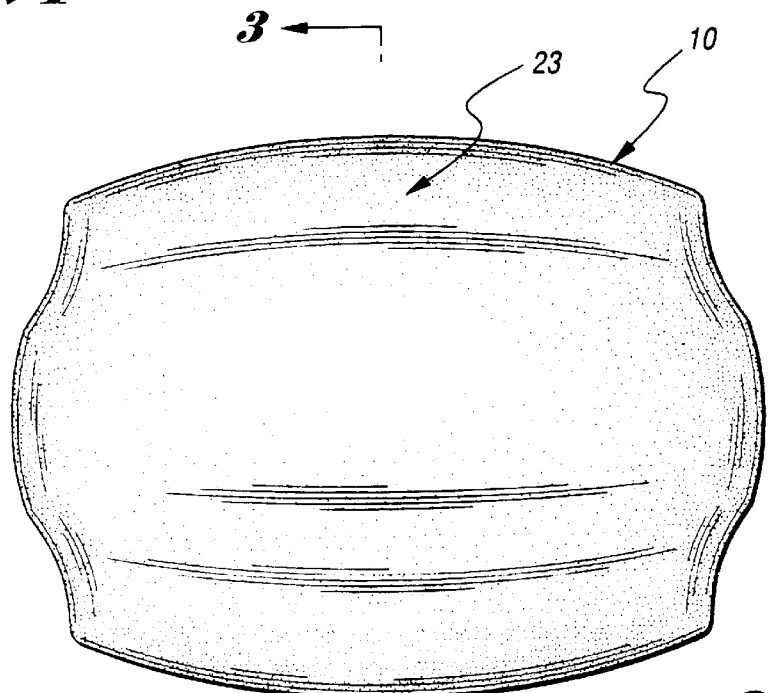
FIG. 2 is a front elevational view of the air bag cover adapted to be mounted at an end of a steering wheel post.

Referring now to FIGS. 2–3, there is illustrated in detail the air bag cover 10 constructed in accordance with the present invention.

A front cover, generally indicated at 12 of the air bag cover 10, is integrally formed with side panels 14 and 18. The front cover 12 includes an inner surface 21 and an outer surface 23. The outer surface 23 is disposed to face the vehicle operator (not shown).

The front cover 12 includes upper and lower portions 20 and 22, respectively. The upper and lower portions 20 and 22 are interconnected to each other at a tear seam 26. The tear seam 26 is of reduced thickness to permit the air bag, as it is inflating, to exert a force at the lower portion 22 of the front cover 12 to cause the upper and lower portions 20 and 22 of the front cover 12 to separate from each other along the tear seam 26.

The upper portion 20 of the front cover 12 is hingedly connected to the side panel 18 at a hinge 28 and the lower portion 22 of the front cover 12 is hingedly connected to the bottom side panel 14 at a hinge 30, as best shown in FIG. 2. After separation from the side panel 16, the upper and lower portions 20 and 22 of the front cover 12 can swing upwardly and downwardly, respectively, and out of the way of the inflating air bag.

The tear seam 26 is, as discussed above, necessarily designed to allow inflation and exit of an air bag (not shown) from the air bag cover 10 to permit its safety function between the steering column and operator (not shown). The tear seam 26 is therefore designed to be the primary or sole, break area of the air bag cover 10 during inflation and exit of the air bag.

Referring to FIG. 4, the tear seam 26 includes, in the preferred embodiment, a concave surface 64 and side surfaces 66,68 immediately adjacent concave surface 64. The side surfaces 66,68 are disposed in a symmetrical, facing relationship with respect to the concave surface 64. Additionally, the concave surface 64 has an inner surface 75 and an outer surface 77 defining a uniform thickness in the range of 0.2 to 0.4 millimeters.

The air bag cover 10 illustrated in FIG. 1 includes a tear seam which is visually imperceptible from the exposed outer surface of the front cover 12. As shown in FIG. 4, the tear seam constructed in accordance with the present invention provides an outer surface 23 of the front cover 12 which is undisturbed by the inclusion of the concave surface 64 and side surfaces 66,68. From the exterior, exposed side of the air bag cover 10, i.e., the outer surface 23, the tear seam 26 is visually imperceptible.

The air bag cover of the present invention therefore provides a cover which does not require any additional parts or cover-up decorating pieces to afford a clean, aesthetically pleasing outer surface. The common, visually noticeable "U" or "H" shaped designs of the prior art are avoided with the present invention. As such, entirely aesthetic front cover designs can be provided on air bag covers which are unrelated and unaffected by the presence of the tear seam 26.

It is preferred that the air bag cover of the present invention be manufactured from a flexible thermoplastic material such as TPO provided by D and S, DYM provided by Dupont, "Santoprene" 201-87 provided by Advance Elastomers Systems of Auburn Hills, Michigan, and other similar thermoplastic materials.

Figure 5:
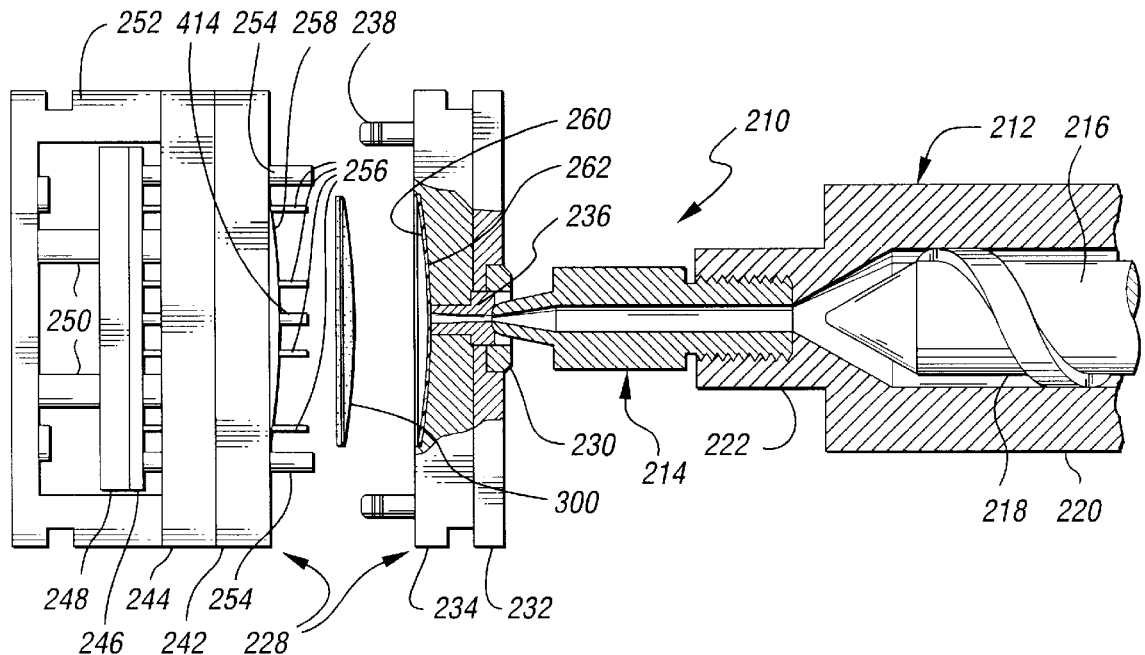
FIG. 5 is a schematic view of a conventional injection molding system which may be utilized to make the air bag cover of the present invention.

Referring now to FIG. 5, there is illustrated a conventional injection molding system, generally indicated at 210, for making the air bag cover 10 of the present invention. Briefly, the injection molding system 210 includes an injection molding machine, generally indicated at 212, having a nozzle, generally indicated at 214, for injecting predetermined amounts or shots of molten resin. The injection molding machine 212 includes a hydraulic screw ram 216 which is disposed in a bore 218 formed in a barrel 220 of the injection molding machine 212. The ram 216 plasticizes and advances resin towards the nozzle 214. Upon complete plasticization of the resin, the screw ram 216 is hydraulically advanced towards threaded portions 222 of the barrel 220 to inject molten plastic through the nozzle 214, as is well known in the art.

The system 210 also includes a mold or mold body generally indicated at 228. As illustrated in FIG. 5, the mold 220 comprises a two-plate mold body. One of the plates includes a locating ring 230 for locating the injection end of the nozzle 214. The locating ring 230 is mounted on a clamp plate 232 which, in turn, is fixably connected to a cavity retainer plate or cavity plate 234. A sprue bushing 236 is disposed within the locating ring 230 and is supported by the clamp plate 232. Leader pins 238 on the cavity plate 234 provide the male half of the male-female connection of the first plate with the second plate of the two-plate mold 228. In particular, the second plate includes leader pin bushings (not shown) which slidably receive and retain the leader pins therein in the closed position of the mold 228. The leader pin bushings are retained within a core retainer plate 242. The core retainer plate 242 is fixably connected to a support plate 244 which in turn is connected to an injector retainer plate 246. The injector retainer plate 246 is connected to an injector plate 248 which, in turn, is supported by support pillars 250. Support plate 244 is also fixably connected to the ends of a U-shaped ejector housing 252 to which the support pillars 250 are also connected. The plate 246 supports a plurality of return pins 254 and ejector pins 256 which extend toward the plate 234 and through the plates 242 and 244. The ejector pins 256 are provided for ejecting particular injection molded part(s) from the mold 228.

Opposing surfaces of male and female mold parts 258 and 260 respectively define a mold cavity 262. The mold part 258 is supported on the plate 242 and the mold part 260 is supported on the cavity retainer plate 234.

Figure 6:
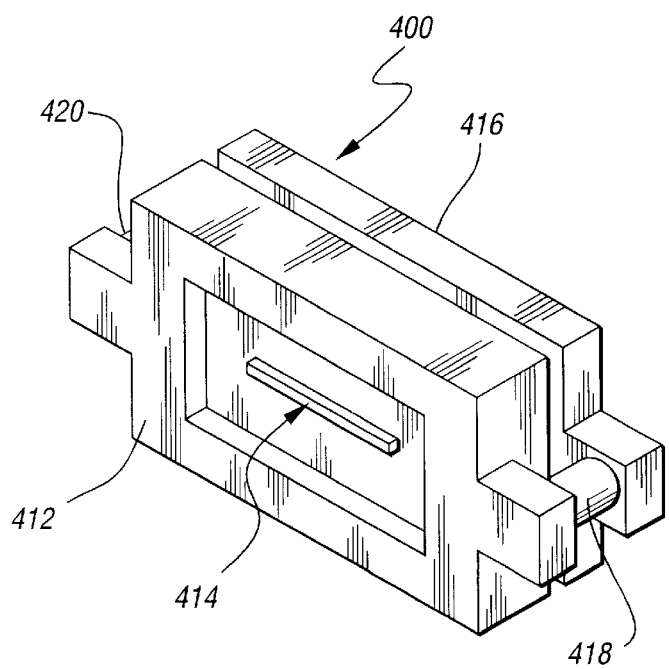
FIG. 6 is a perspective view of two mold halves of a typical injection mold.

Referring now to FIG. 6, there is illustrated a perspective view of a typical injection mold 400 having a first mold half 410 and a second mold half 412. The injection mold 400 further includes an insert 414. The insert 414 is mounted on a steel plate 416 which moves back and forth through the first and second mold halves 410, 412 via a pair of cylinders 418, 420, as shown in the sectional view of the injection mold 400 in FIG. 7. The cylinders may be hydraulic cylinders or any other suitable mechanical cylinder. The insert 414 has a shape corresponding to the shape of the desirable tear seam, i.e., "U" or "H" shaped.

During the typical injection molding process of an air bag cover, the first and second mold halves 410, 412 are brought together to form the desired shape of the air bag cover. After the plastic has been injected but before it solidifies completely, the insert 414 is extended to displace the plastic at a location defining the tear seam. Thereafter, the insert 414 may be retracted either prior to or after removing the completed air bag cover.

Figure 7:
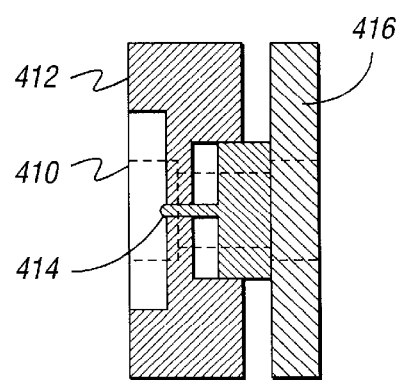
FIG. 7 is a sectional view of the two mold halves shown in FIG. 6.
Figure 8:
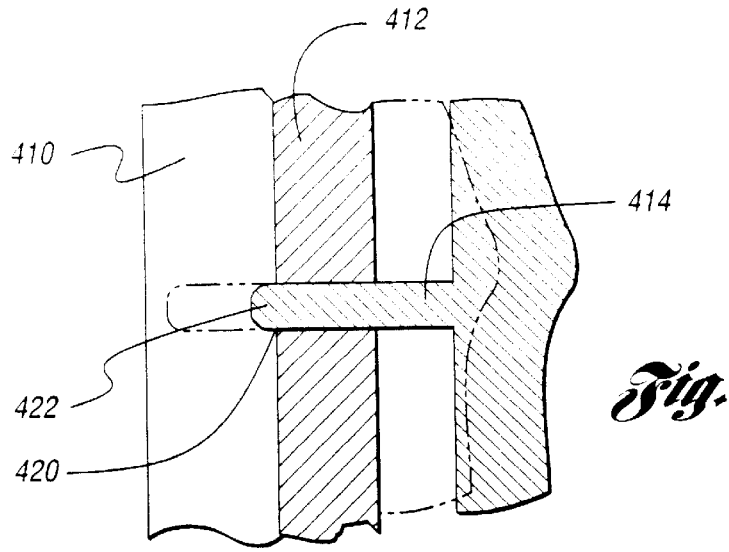
FIG. 8 is an enlarged view of a portion of the two mold haves shown in FIG. 7 in which the retracted position of the movable insert is shown in the solid lines while the extended position of the movable insert is shown in the dotted lines.

FIG. 8 is an enlarged view of a portion of the two mold halves 410, 412 shown in FIGS. 6 and 7 in which the retracted position of the insert 414 is shown in the solid lines while the extended position of the insert 414 is shown in the dotted lines. The insert 414 preferably has a rounded tip 422 that extends slightly above the surface of the second mold half 412 through a hole 420 when in the retracted position.. A rounded tip provides a smoother finish in the completed air bag cover. By having the insert 414 extend slightly above the surface of the second mold half 412 when in the retracted position, there are no gaps present in the second mold half 412 through the hold 420 which would fill with plastic when it is injected into the mold halves 410, 412.

Figure 9:
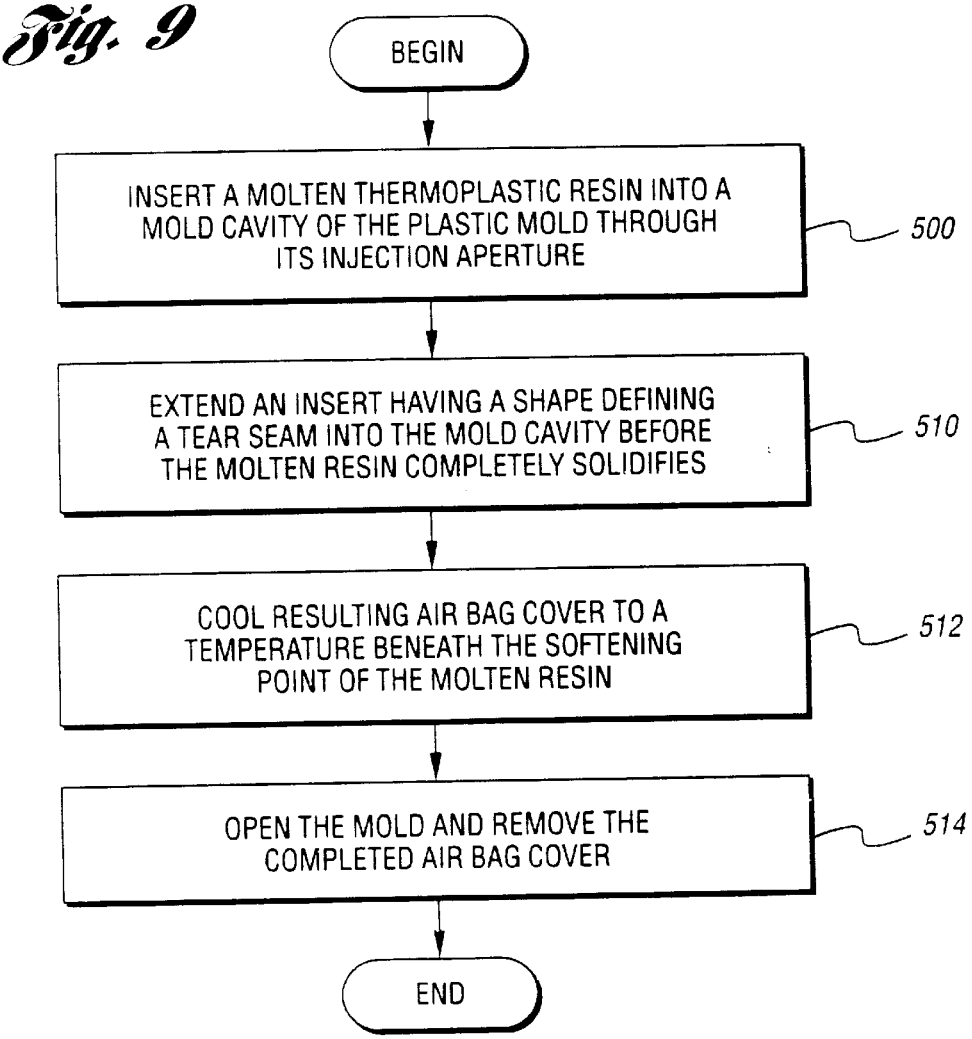
FIG. 9 is a block diagram flow chart illustrating the various method steps taken to practice the method of the present invention in order to make the air bag cover having the hidden tear seam.

Referring now to FIG. 9, there is illustrated the various process steps of the method of the present invention. Molten thermoplastic resin is first inserted into a mold cavity of the plastic mold through its injection aperture, as shown at block 500.

Next, an insert having a shape defining a tear seam is extended into the mold cavity before the molten resin completely solidifies, as shown at block 510. As shown at block 512, the resulting air bag cover is cooled to a temperature beneath the softening point of the molten resin.

Finally, at block 514, the mold is open and the completed air bag cover is removed.

In this way, a thermoplastic air bag cover is formed with a hidden tear seam in which the thickness of the air bag cover at the tear seam is minimized. A reduced thickness in the tear seam allows the use of less pressure to inflate the air bag. Turbulence caused by plastic material flowing over a typical projection is also eliminated so that there is an absence of knit lines or swirl lines in the resulting air bag cover. Furthermore, the thermoplastic air bag cover is less expensive, lighter in weight and more durable than an equivalent air bag cover manufactured utilizing RIM molding.

While the best modes for carrying out the invention have been described in detail, those familiar with the art to which this invention relates will recognize various alternative designs and embodiments for practicing the invention as defined by the following claims.

What is claimed is:

1. A method of making an air bag cover for an inflatable air bag system, the air bag cover having front and back surfaces and having a tear seam visually imperceptible from the front surface, the method comprising the steps of:

injecting molten thermoplastic into a mold having first and second mold halves defining a mold cavity corresponding to a shape of the air bag cover;

moving an insert from a retracted position to an extended position within the mold cavity after the step of injecting but before the molten thermoplastic completely solidifies, wherein the insert has a tip portion having a predetermined width defining the tear seam and an elongated portion having a length substantially greater than the predetermined width, and wherein in the extended position the insert extends from within one of the first and second mold halves to within approximately 0.2 to 0.4 millimeters of the other one of the first and second mold halves so as to displace the thermoplastic along a substantially continuous line defining the tear seam;

permitting the resulting air bag cover to cool to a temperature beneath the softening point of the plastic with the insert in its extended position; and removing the completed air bag cover from the mold.

2. The method as recited in claim 1 further comprising the step of retracting the insert prior to removing the completed air bag cover.

3. The method as recited in claim 1 further comprising the step of retracting the insert after removing the completed air bag cover.

4. The method as recited in claim 1 wherein the step of moving the insert includes the step of linearly moving the insert.

\* \* \* \* \*